(12) United States Patent
Dobashi et al.

(10) Patent No.: US 6,393,019 B1
(45) Date of Patent: May 21, 2002

(54) MATRIX SWITCH

(75) Inventors: Kyosuke Dobashi, Higashimurayama; Kazuhiko Ide, Yamato, both of (JP)

(73) Assignee: Kabushiki Kaisha Toshiba, Kanagawa (JP)

( * ) Notice: Subject to any disclaimer, the term of this patent is extended or adjusted under 35 U.S.C. 154(b) by 65 days.

(21) Appl. No.: 09/613,456

(22) Filed: Jul. 10, 2000

Related U.S. Application Data (63) Continuation of application No. PCT/JP99/06222, filed on Nov. 9, 1999.

(30) Foreign Application Priority Data

Nov. 10, 1998 (JP) ............................................. 10-319158

(51) Int. Cl.[7] ........................... H04L 12/28; H04L 12/50
(52) U.S. Cl. ....................... 370/352; 370/360; 370/366; 370/427; 340/2.1; 340/2.22; 379/242
(58) Field of Search ................................. 370/351, 352, 370/357, 360, 361, 366, 368, 381, 383, 386, 388, 427, 428, 429, 417; 340/2.1, 2.22, 827, 825.78, 825.8; 379/219, 242, 273; 375/372

(56) References Cited

U.S. PATENT DOCUMENTS

| 5,046,064 | A | | 9/1991 | Suzuki et al. ............... 370/422 |
|---|---|---|---|---|
| 5,189,666 | A | * | 2/1993 | Kagawa ...................... 370/429 |
| 5,412,646 | A | | 5/1995 | Cyr et al. .................... 370/411 |
| 5,440,550 | A | * | 8/1995 | Follett ........................ 340/2.1 |
| 5,450,074 | A | * | 9/1995 | Yoshifuji ................... 340/2.22 |
| 5,619,510 | A | | 4/1997 | Kurano ....................... 370/417 |
| 5,801,641 | A | * | 9/1998 | Yang et al. ................ 340/2.22 |
| 5,832,303 | A | * | 11/1998 | Murase et al. ............. 340/2.22 |

FOREIGN PATENT DOCUMENTS

JP 8-88872 4/1996
JP 10-254842 9/1998

* cited by examiner

*Primary Examiner*—Alpus H. Hsu
*Assistant Examiner*—Afsar M. Qureshi
(74) *Attorney, Agent, or Firm*—Pillsbury Winthrop LLP (57) ABSTRACT

A matrix switch comprises a matrix switch main body (2), a preprocessing block (1) provided on an input side of the matrix switch main body (2), and a postprocessing block (3) provided on an output side of the matrix switch main body (2), wherein each of the preprocessing block (1), the matrix switch main body (2) and the postprocessing block (3) comprises a circuit, which parallel-converts a line input with each setting bit width, performs a bit stream operation in the setting bit width, serially converts it, and performs line output, respectively, and the matrix switch main body (2) is divided into the setting bit width parallel-converted with the preprocessing block (1) and switching-control is performed.

18 Claims, 12 Drawing Sheets

PRIOR ART

| | EARLIER INPUT ORDER | | | | | | | LATER INPUT ORDER | |
|---|---|---|---|---|---|---|---|---|---|
| INPUT DATA #1 | 1-b1 | 1-b2 | 1-b3 | 1-b4 | 1-b5 | 1-b6 | 1-b7 | 1-b8 | ... |
| INPUT DATA #2 | 2-b1 | 2-b2 | 2-b3 | 2-b4 | 2-b5 | 2-b6 | 2-b7 | 2-b8 | ... |
| INPUT DATA #3 | 3-b1 | 3-b2 | 3-b3 | 3-b4 | 3-b5 | 3-b6 | 3-b7 | 3-b8 | ... |
| INPUT DATA #4 | 4-b1 | 4-b2 | 4-b3 | 4-b4 | 4-b5 | 4-b6 | 4-b7 | 4-b8 | ... |
| INPUT DATA #5 | 5-b1 | 5-b2 | 5-b3 | 5-b4 | 5-b5 | 5-b6 | 5-b7 | 5-b8 | ... |
| INPUT DATA #6 | 6-b1 | 6-b2 | 6-b3 | 6-b4 | 6-b5 | 6-b6 | 6-b7 | 6-b8 | ... |
| INPUT DATA #7 | 7-b1 | 7-b2 | 7-b3 | 7-b4 | 7-b5 | 7-b6 | 7-b7 | 7-b8 | ... |
| INPUT DATA #8 | 8-b1 | 8-b2 | 8-b3 | 8-b4 | 8-b5 | 8-b6 | 8-b7 | 8-b8 | ... |
| INPUT DATA #9 | 9-b1 | 9-b2 | 9-b3 | 9-b4 | 9-b5 | 9-b6 | 9-b7 | 9-b8 | ... |
| INPUT DATA #10 | 10-b1 | 10-b2 | 10-b3 | 10-b4 | 10-b5 | 10-b6 | 10-b7 | 10-b8 | ... |
| INPUT DATA #11 | 11-b1 | 11-b2 | 11-b3 | 11-b4 | 11-b5 | 11-b6 | 11-b7 | 11-b8 | ... |
| INPUT DATA #12 | 12-b1 | 12-b2 | 12-b3 | 12-b4 | 12-b5 | 12-b6 | 12-b7 | 12-b8 | ... |
| INPUT DATA #13 | 13-b1 | 13-b2 | 13-b3 | 13-b4 | 13-b5 | 13-b6 | 13-b7 | 13-b8 | ... |
| INPUT DATA #14 | 14-b1 | 14-b2 | 14-b3 | 14-b4 | 14-b5 | 14-b6 | 14-b7 | 14-b8 | ... |
| INPUT DATA #15 | 15-b1 | 15-b2 | 15-b3 | 15-b4 | 15-b5 | 15-b6 | 15-b7 | 15-b8 | ... |
| INPUT DATA #16 | 16-b1 | 16-b2 | 16-b3 | 16-b4 | 16-b5 | 16-b6 | 16-b7 | 16-b8 | ... |

FIG. 8

| | EARLIER INPUT ORDER | | | | | | | LATER INPUT ORDER | |
|---|---|---|---|---|---|---|---|---|---|
| OUTPUT DATA #1 | 1-b1 | 2-b1 | 3-b1 | 4-b1 | 1-b5 | 2-b5 | 3-b5 | 4-b5 | ... |
| OUTPUT DATA #2 | 1-b2 | 2-b2 | 3-b2 | 4-b2 | 1-b6 | 2-b6 | 3-b6 | 4-b6 | ... |
| OUTPUT DATA #3 | 1-b3 | 2-b3 | 3-b3 | 4-b3 | 1-b7 | 2-b7 | 3-b7 | 4-b7 | ... |
| OUTPUT DATA #4 | 1-b4 | 2-b4 | 3-b4 | 4-b4 | 1-b8 | 2-b8 | 3-b8 | 4-b8 | ... |
| OUTPUT DATA #5 | 5-b1 | 6-b1 | 7-b1 | 8-b1 | 5-b5 | 6-b5 | 7-b5 | 8-b5 | ... |
| OUTPUT DATA #6 | 5-b2 | 6-b2 | 7-b2 | 8-b2 | 5-b6 | 6-b6 | 7-b6 | 8-b6 | ... |
| OUTPUT DATA #7 | 5-b3 | 6-b3 | 7-b3 | 8-b3 | 5-b7 | 6-b7 | 7-b7 | 8-b7 | ... |
| OUTPUT DATA #8 | 5-b4 | 6-b4 | 7-b4 | 8-b4 | 5-b8 | 6-b8 | 7-b8 | 8-b8 | ... |
| OUTPUT DATA #9 | 9-b1 | 10-b1 | 11-b1 | 12-b1 | 9-b5 | 10-b5 | 11-b5 | 12-b5 | ... |
| OUTPUT DATA #10 | 9-b2 | 10-b2 | 11-b2 | 12-b2 | 9-b6 | 10-b6 | 11-b6 | 12-b6 | ... |
| OUTPUT DATA#11 | 9-b3 | 10-b3 | 11-b3 | 12-b3 | 9-b7 | 10-b7 | 11-b7 | 12-b7 | ... |
| OUTPUT DATA #12 | 9-b4 | 10-b4 | 11-b4 | 12-b4 | 9-b8 | 10-b8 | 11-b8 | 12-b8 | ... |
| OUTPUT DATA #13 | 13-b1 | 14-b1 | 15-b1 | 16-b1 | 13-b5 | 14-b5 | 15-b5 | 16-b5 | ... |
| OUTPUT DATA #14 | 13-b2 | 14-b2 | 15-b2 | 16-b2 | 13-b6 | 14-b6 | 15-b6 | 16-b6 | ... |
| OUTPUT DATA #15 | 13-b3 | 14-b3 | 15-b3 | 16-b3 | 13-b7 | 14-b7 | 15-b7 | 16-b7 | ... |
| OUTPUT DATA #16 | 13-b4 | 14-b4 | 15-b4 | 16-b4 | 13-b8 | 14-b8 | 15-b8 | 16-b8 | ... |

FIG. 9

|  | EARLIER INPUT ORDER | | | | LATER INPUT ORDER | | | | |
|---|---|---|---|---|---|---|---|---|---|
| INPUT DATA #1 | 1-b1 | 2-b1 | 3-b1 | 4-b1 | 1-b5 | 2-b5 | 3-b5 | 4-b5 | ... |
| INPUT DATA #2 | 1-b2 | 2-b2 | 3-b2 | 4-b2 | 1-b6 | 2-b6 | 3-b6 | 4-b6 | ... |
| INPUT DATA #3 | 1-b3 | 2-b3 | 3-b3 | 4-b3 | 1-b7 | 2-b7 | 3-b7 | 4-b7 | ... |
| INPUT DATA #4 | 1-b4 | 2-b4 | 3-b4 | 4-b4 | 1-b8 | 2-b8 | 3-b8 | 4-b8 | ... |
| INPUT DATA #5 | 5-b1 | 6-b1 | 7-b1 | 8-b1 | 5-b5 | 6-b5 | 7-b5 | 8-b5 | ... |
| INPUT DATA #6 | 5-b2 | 6-b2 | 7-b2 | 8-b2 | 5-b6 | 6-b6 | 7-b6 | 8-b6 | ... |
| INPUT DATA #7 | 5-b3 | 6-b3 | 7-b3 | 8-b3 | 5-b7 | 6-b7 | 7-b7 | 8-b7 | ... |
| INPUT DATA #8 | 5-b4 | 6-b4 | 7-b4 | 8-b4 | 5-b8 | 6-b6 | 7-b8 | 8-b8 | ... |
| INPUT DATA #9 | 9-b1 | 10-b1 | 11-b1 | 12-b1 | 9-b5 | 10-b5 | 11-b5 | 12-b5 | ... |
| INPUT DATA #10 | 9-b2 | 10-b2 | 11-b2 | 12-b2 | 9-b6 | 10-b6 | 11-b6 | 12-b6 | ... |
| INPUT DATA #11 | 9-b3 | 10-b3 | 11-b3 | 12-b3 | 9-b7 | 10-b7 | 11-b7 | 12-b7 | ... |
| INPUT DATA #12 | 9-b4 | 10-b4 | 11-b4 | 12-b4 | 9-b8 | 10-b8 | 11-b8 | 12-b8 | ... |
| INPUT DATA #13 | 13-b1 | 14-b1 | 15-b1 | 16-b1 | 13-b5 | 14-b5 | 15-b5 | 16-b5 | ... |
| INPUT DATA #14 | 13-b2 | 14-b2 | 15-b2 | 16-b2 | 13-b6 | 14-b6 | 15-b6 | 16-b6 | ... |
| INPUT DATA #15 | 13-b3 | 14-b3 | 15-b3 | 16-b3 | 13-b7 | 14-b7 | 15-b7 | 16-b7 | ... |
| INPUT DATA #16 | 13-b4 | 14-b4 | 15-b4 | 16-b4 | 13-b8 | 14-b8 | 15-b8 | 16-b8 | ... |

FIG. 10

|  | EARLIER INPUT ORDER | | | | LATER INPUT ORDER | | | | |
|---|---|---|---|---|---|---|---|---|---|
| OUTPUT DATA #1 | 1-b1 | 1-b2 | 1-b3 | 1-b4 | 1-b5 | 1-b6 | 1-b7 | 1-b8 | ... |
| OUTPUT DATA #2 | 2-b1 | 2-b2 | 2-b3 | 2-b4 | 2-b5 | 2-b6 | 2-b7 | 2-b8 | ... |
| OUTPUT DATA #3 | 3-b1 | 3-b2 | 3-b3 | 3-b4 | 3-b5 | 3-b6 | 3-b7 | 3-b8 | ... |
| OUTPUT DATA #4 | 4-b1 | 4-b2 | 4-b3 | 4-b4 | 4-b5 | 4-b6 | 4-b7 | 4-b8 | ... |
| OUTPUT DATA #5 | 5-b1 | 5-b2 | 5-b3 | 5-b4 | 5-b5 | 5-b6 | 5-b7 | 5-b8 | ... |
| OUTPUT DATA #6 | 6-b1 | 6-b2 | 6-b3 | 6-b4 | 6-b5 | 6-b6 | 6-b7 | 6-b8 | ... |
| OUTPUT DATA #7 | 7-b1 | 7-b2 | 7-b3 | 7-b4 | 7-b5 | 7-b6 | 7-b7 | 7-b8 | ... |
| OUTPUT DATA #8 | 8-b1 | 8-b2 | 8-b3 | 8-b4 | 8-b5 | 8-b6 | 8-b7 | 8-b8 | ... |
| OUTPUT DATA #9 | 9-b1 | 9-b2 | 9-b3 | 9-b4 | 9-b5 | 9-b6 | 9-b7 | 9-b8 | ... |
| OUTPUT DATA #10 | 10-b1 | 10-b2 | 10-b3 | 10-b4 | 10-b5 | 10-b6 | 10-b7 | 10-b8 | ... |
| OUTPUT DATA #11 | 11-b1 | 11-b2 | 11-b3 | 11-b4 | 11-b5 | 11-b6 | 11-b7 | 11-b8 | ... |
| OUTPUT DATA #12 | 10-b1 | 12-b2 | 12-b3 | 12-b4 | 12-b5 | 12-b6 | 12-b7 | 12-b8 | ... |
| OUTPUT DATA #13 | 13-b1 | 13-b2 | 13-b3 | 13-b4 | 13-b5 | 13-b6 | 13-b7 | 13-b8 | ... |
| OUTPUT DATA #14 | 14-b1 | 14-b2 | 14-b3 | 14-b4 | 14-b5 | 14-b6 | 14-b7 | 14-b8 | ... |
| OUTPUT DATA #15 | 15-b1 | 15-b2 | 15-b3 | 15-b4 | 15-b5 | 15-b6 | 15-b7 | 15-b8 | ... |
| OUTPUT DATA #16 | 16-b1 | 16-b2 | 16-b3 | 16-b4 | 16-b8 | 16-b6 | 16-b7 | 16-b8 | ... |

MATRIX SWITCH

CROSS REFERENCE TO RELATED APPLICATIONS

This is a continuation of Application No. PCT/JP99/06222, filed Nov. 9, 1999.

This application is based upon and claims the benefit of priority from the prior Japanese Patent Application No. 10-319158, filed Nov. 10, 1998, the entire contents of which are incorporated herein by reference.

BACKGROUND OF THE INVENTION

The present invention relates to a matrix switch, which is suitable for applying to a node (transmission equipment) in a ring network and comprises a function to connect a plurality of digital signal input lines with an arbitrary line of a plurality of output lines.

In the ring network, which is constructed by using an optical cable, the matrix switch, which connects the plurality of digital signal input lines with an arbitrary line of the plurality of output lines, is provided in add-drop multiplexer (ADM), which is the transmission equipment constructing each node.

Figure 1:
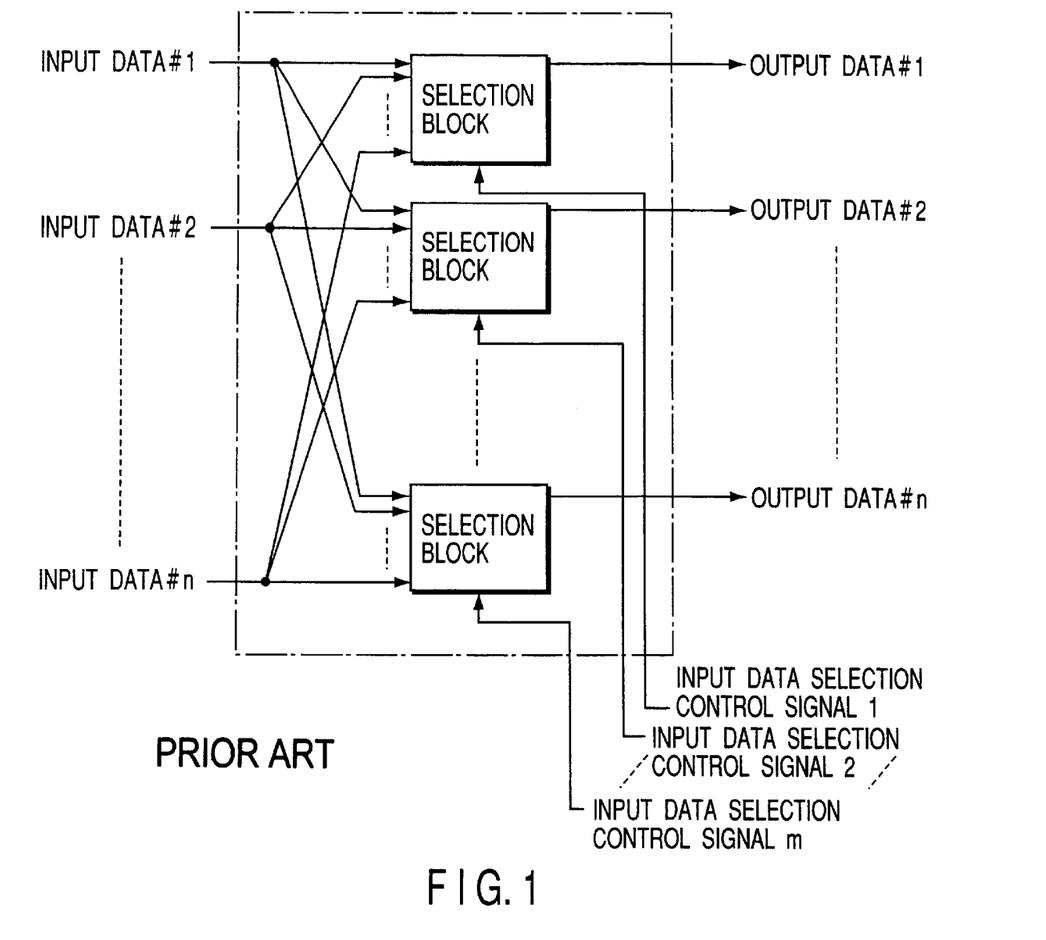
FIG. 1 is a block diagram, which shows a configuration of the conventional matrix switch.

This conventional kind of matrix switch achieves n×m matrix switch by comprising m selection blocks to select one line from n input lines (#1 to #n) as shown in FIG. 1. That is, the input data to the matrix switch block is directly branched and is connected with each selection block, and the input data specified according to input data selection control signals (1 to m) from the outside equipment is selected and is output, conventionally.

In the conventional configuration as described above, the I/O signals of the matrix switch block increases and the circuit scale becomes huge, too, when the scale of the matrix switch becomes large. Therefore, it is necessary to input and output all of the signals, which are input and output from/to the matrix switch blocks, to one matrix switch block, when it is achieved as an equipment. Therefore, there is a disadvantage of a very difficult achievement caused by a physical restriction in the number of pins of connectors and the circuit mounting in the printed circuit board or modules of matrix switch blocks.

It is possible to apply the multistep connection configuration with a plurality of small-scale matrix switches by dividing the matrix switch block to solve this physical disadvantage. Though the number of I/O signals of one matrix switch and the circuit scale is decreased in this configuration, there is the disadvantage that the control algorithm of the entire matrix switch block becomes complex. That is, even if the input block and the output block of the matrix switch are the same parts, for example, the plurality of routes can be selected.

As described above, in the conventional matrix switch configuration, since n×m matrix switch is achieved by comprising m selection blocks to select one line among n input lines, the number of the I/O signals of the matrix switch block increases and the circuit scale becomes huge, too when the scale of the matrix switch becomes large, and it is necessary to input and output all of the signals, which are input and output from/to the matrix switch block, from/to one matrix switch block when it is achieved as an equipment. Therefore, there is a disadvantage at a very difficult achievement caused by a physical restriction in the number of pins of connectors and the circuit mounting in the printed circuit board or the module of matrix switch blocks. To solve this physical disadvantage, the number of I/O signals of one matrix switch and the circuit scale are decreased when applying the multistep connection configuration with a plurality of small-scale matrix switches by dividing the matrix switch block, but there is a disadvantage that the control algorithm of the entire matrix switch block becomes complex.

BRIEF SUMMARY OF THE INVENTION

An object of the present invention is to provide a matrix switch in which the number of data lines input and output from/to a matrix switch block is decreased, function block division is easy when it is achieved as an equipment, in addition, complex communication path setting algorithm is not required even if the matrix switch block is divided and control of the matrix switch block is possible by the same algorithm as existing configuration.

The matrix switch according to the present invention characterized by comprising a matrix switch main body, a preprocessing block provided on an input side of the matrix switch main body, and a postprocessing block provided on an output side of the matrix switch main body, in which each of the preprocessing block, the matrix switch main body and the postprocessing block comprises a circuit, which parallel-converts a line input with each setting bit width, performs a bit stream operation in the setting bit width, serial-converts it, and performs line output, respectively, and the matrix switch main body is divided into the setting bit width parallel-converted with the preprocessing block and switching-control is performed. In other words, the matrix switch according to the present invention is characterized in that a line input is parallel-converted with a predetermined bit width, and a selection processing is performed with a plurality of matrix switch main bodies having a width corresponding to each of plurality of bit widths, thereafter a serial conversion is performed and a serial-converted signal is output.

More specifically, a matrix switch according to the present invention, is comprising: a preprocessing block having j preprocessing basic blocks (n=i×j: where, n, i, j, and k are natural numbers), wherein a block including n first parallel conversion blocks, which perform i-bit parallel conversion of bit serial data of each of n input lines, and an i first multiplex blocks, which multiplex a k-th bit ($1 \leq k \leq i$) of data, which performs i-bit parallel conversion with the first parallel conversion block for i input lines, are assumed to be one of the preprocessing basic blocks; a matrix switch block having i matrix switch basic blocks (where, m and q are natural numbers), wherein j second parallel conversion blocks, which performs i-bit parallel conversion of the data of the j input lines processed by the preprocessing block, m selection blocks, which selects one data from i×j data in which i-bit parallel conversion is performed with the second parallel conversion block, and q second multiplex blocks, which multiplex i-lines of the data selected with the selection block, are assumed to be one of the matrix switch basic blocks; and a postprocessing block having p postprocessing basic blocks (m=i×q), wherein the third parallel conversion block, which performs i-bit parallel conversion of q×i data output from the matrix switch block, and a third multiplex block, which multiplexes i input lines of k-th bit of data in which i-bit parallel conversion is performed with the third parallel conversion block are assumed to be one of the postprocessing basic blocks.

The preferred manners are as follows in the above-mentioned each matrix switch.

(1) The preprocessing block comprises an elastic buffer to an input terminal thereof.

(2) The matrix switch block comprises an elastic buffer to an input terminal thereof.

(3) The postprocessing block comprises an elastic buffer to an input terminal thereof.

(4). The preprocessing block comprises a first monitor block, which monitors an input data and a first P-AIS insertion block, which inserts a P-AIS signal into the input data when abnormality of the input data is detected by the first monitor block, at a previous stage of the first parallel conversion block, the matrix switch block comprises a second monitor block, which monitors an input data and a fixed data insertion block, which inserts fixed data into the input data when abnormality of input data is detected by the second monitor block, at a previous stage of the second parallel conversion block, and the postprocessing block comprises a third monitor block, which is provided at a previous stage of the third parallel conversion block and monitors an input data, a fourth monitor block, which is provided at a latter stage of the third parallel conversion block and detects a fixed data inserted by the fixed data insertion block, a first logical sum block, which outputs a logical sum of outputs from the third monitor block, a second logical sum block, which outputs a logical sum of outputs from the first logical sum block and the fourth monitor block, and a P-AIS insertion block, which inserts a P-AIS signal into an output signal from the third monitor block according to the output from the second logical sum block.

According to the matrix switch according to the present invention, the number of the data lines input and output from/to the matrix switch main body (matrix switch block) is decreased by a parallel/serial conversion with the preprocessing block, the matrix switch block, and the postprocessing block, and the matrix switch main body (matrix switch block) having a width corresponding to the parallel bit width parallel-converted by the preprocessing block performs a division processing. Therefore, the function block division becomes easy when it is achieved as an equipment. In addition, a complex communication path setting algorithm is not required even when the matrix switch main body (matrix switch block) is divided, and it becomes possible to control the matrix switch main body (matrix switch block) by the same algorithm as a conventional configuration. In addition, when the bit rate of the I/O data rises, the selection block of the matrix switch main body (matrix switch block) also has the advantage of enabling a low-speed processing.

As described above, according to the present invention, the following matrix switch can be provided, that is, the number of the data input and output from/to the matrix switch block can be decreased, the function block division is easy when it is achieved as a equipment, and, in addition, the switch scale can be easily expanded without request of a complex communication path setting algorithm even when the matrix switch block is divided, and the matrix switch block can be controlled by the same algorithm as an existing configuration. When the bit rate of the I/O data rises, the selection block of the matrix switch block (switch main body) also has the advantage of enabling a low-speed processing. In addition, when the phase shift by wiring the cable between each of blocks, etc. are considered, an operation with high reliability can be secured by further relaxing the restriction in the specification by arranging the elastic buffer at one of or all of the input terminals of the preprocessing block, the input terminal of the matrix switch block, or the input terminal of the postprocessing block, and constructing to perform processing after all of the frame phases of input data are coincide.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a figure, which shows a bit stream of an input data of the preprocessing block to explain an operation of the first embodiment;

FIG. 9 is a figure, which shows a bit stream of an output data of the preprocessing block to explain an operation of the first embodiment;

FIG. 10 is a figure, which shows a bit stream of an input data of the postprocessing block to explain an operation of the first embodiment;

FIG. 11 is a figure, which shows a bit stream of an output data of the postprocessing block to explain an operation of the first embodiment;

DETAILED DESCRIPTION OF THE INVENTION

Hereafter, the embodiment of the present invention will be explained referring to the drawings.

Figure 2:
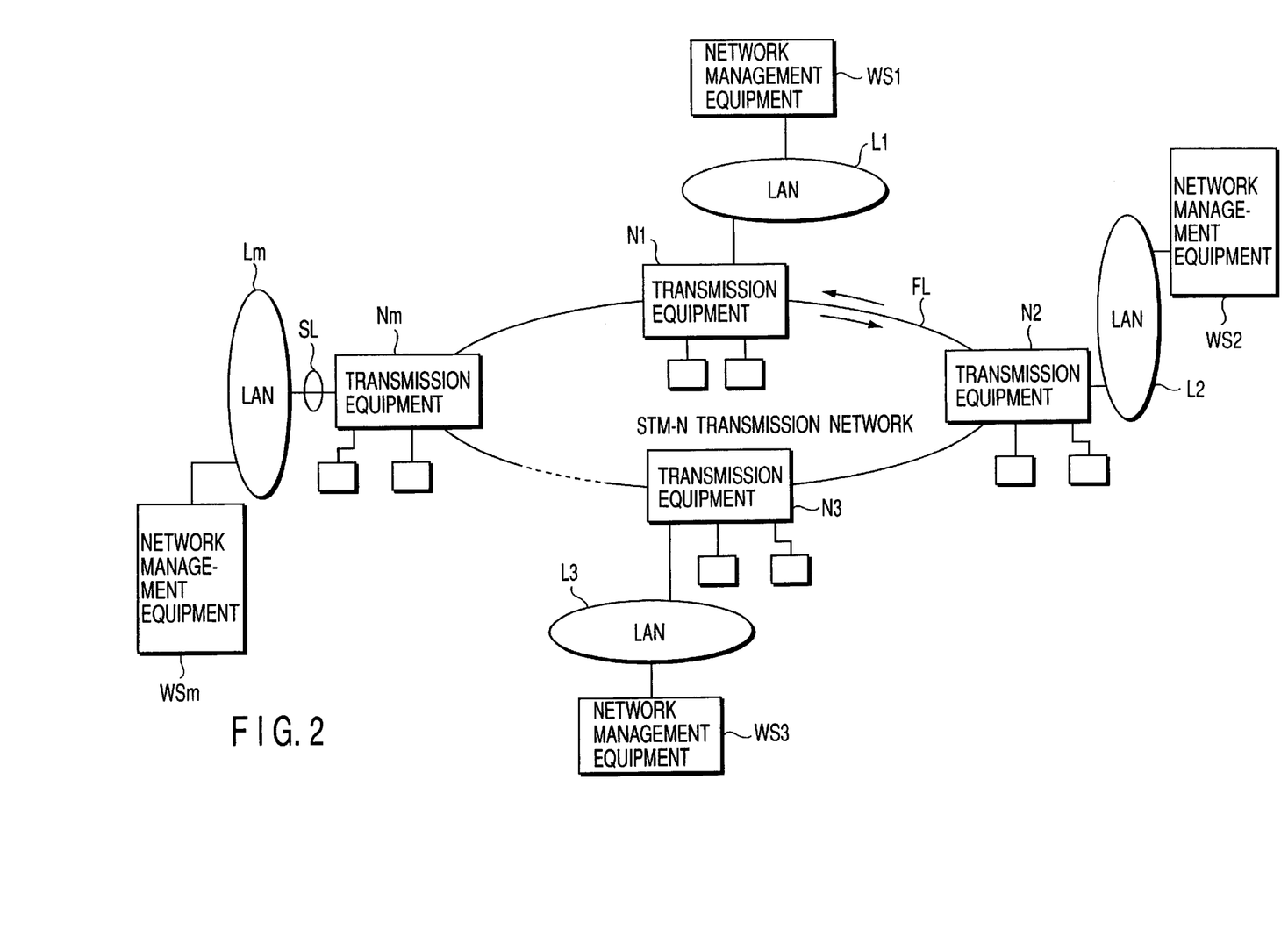
FIG. 2 is a block diagram, which shows a configuration of the information communication system to which matrix switch according to the present invention is applied.

FIG. 2 is a block diagram, which shows the configuration of the information communication system to which the matrix switch according to the present invention is applied.

In the system shown in FIG. 2, m transmission equipments (N1 to Nm), which become nodes are connected in the ring-like shape through, for example, high-speed line (FL) of the STM-64 line, etc. on the assumption of the ring network in accordance with SDH. Information on an arbitrary channel among information transmitted through high-speed line (FL) is dropped to low-speed line (SL) with transmission equipments (N1 to Nm), and is sent to various communication equipments of the exchange etc.

Each of transmission equipments (N1 to Nm) is connected with network management equipments (WS1 to WSm), respectively, through LANs (Local Area Networks; L1 to Lm). These network management equipments (WS1 to WSm) are achieved, for example, as a general-purpose workstation, and any one of network management equipments (WS1 to WSm) can perform the monitor control to each of transmission equipments (N1 to Nm). Matrix switch, which constructs add-drop multiplex (ADM) block N10 is provided in each of transmission equipments (N1 to Nm).

Figure 3:
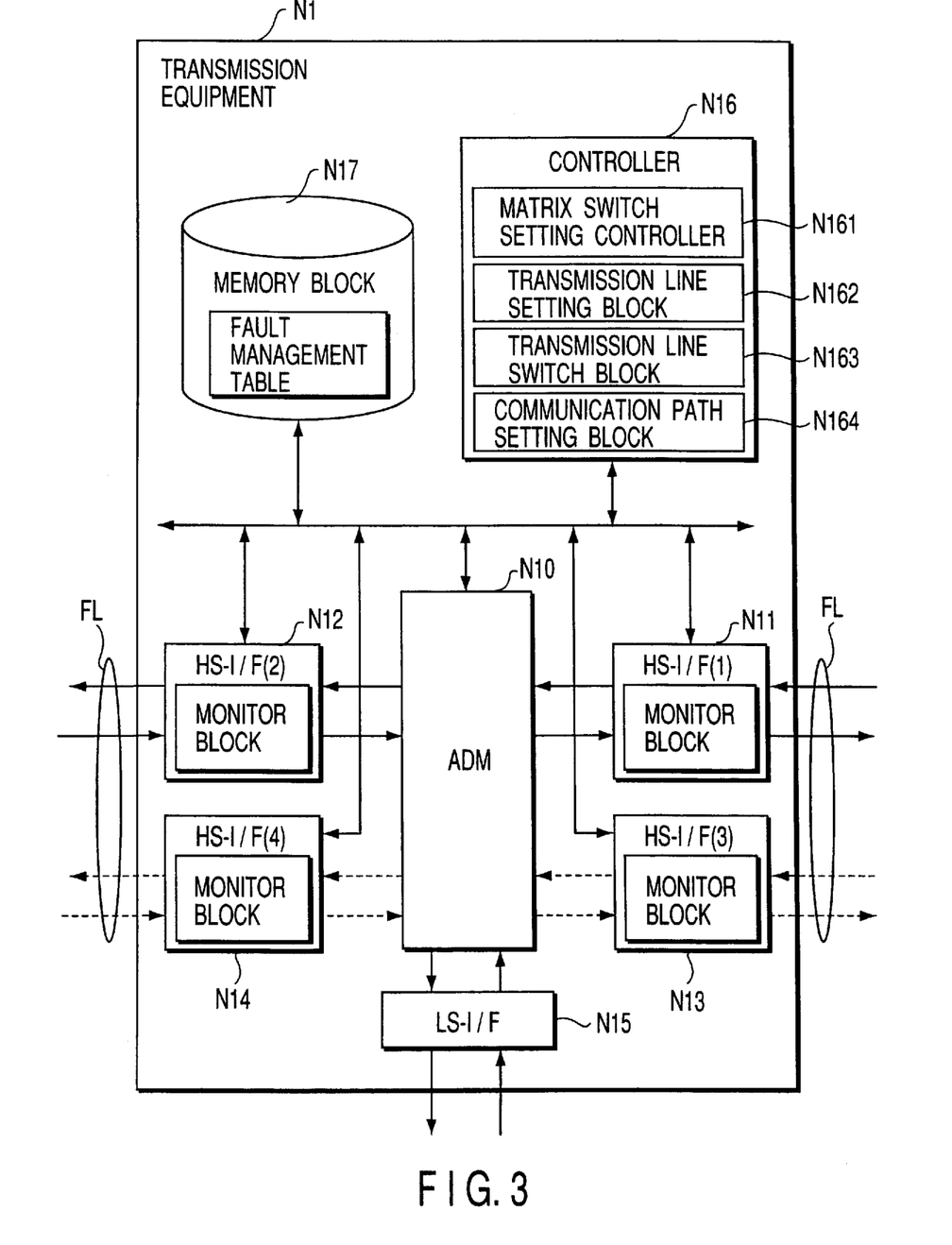
FIG. 3 is a block diagram, which shows a main component of the transmission equipment in the above-mentioned information communication system.

A main component of each of transmission equipments (N1 to Nm) is shown in FIG. 3. Since a main component of each of transmission equipments (N1 to Nm) is the same, only a transmission equipment N1 is shown in FIG. 3.

Transmission equipment N1 comprises add-drop multiplex (ADM) block N10 achieved by the matrix switch applied in the present invention. The synchronous transmission data transmitted through high-speed line (FL) is introduced into add-drop multiplex (ADM) block N10 through interface blocks (HS-I/F1 to HS-I/F4) N11 to N14, and, in addition, is dropped to the low-speed line side by interface block (LS-I/F) N15 of the low-speed line side. The synchronous transmission data input from the low-speed line side is introduced into add-drop multiplex (ADM) block N10 through interface block (LS-I/F) N15 of the low-speed line side, and is multiplied on high-speed line (FL).

The operation control to add-drop multiplex (ADM) block N10 is performed by controller N16 based on information given from each of interface blocks (HS-I/F1 to HS-I/F4) N11 to N14.

Controller N16 is constructed by the microcomputer, etc., and controls the matrix switch, which constructs add-drop multiplex (ADM) block N10 under the program control of matrix switch setting controller N161. In addition, controller N16 comprises transmission line setting block N162, transmission line switch block N163, and communication path setting block N164, etc., in addition to the known control means (not shown in the figure) according to the information communication between other transmission equipments N2 to Nm and network management equipment (WS1). When the fault is occurred in the system, transmission line setting block N162 decides the state of the switch of the transmission line to restore the traffic referring to so-called ring map, which associates with the state of the setting of the communication path of each transmission equipment and the current state of the switch of the equipment. The above-mentioned ring map and information, according to the state of the switch of the equipment are stored in the memory block beforehand. Transmission line switch block N163 executes the switch control of the transmission line based on the decided state of the switch as the mentioned above and the state of the switch requested by network management equipment (WS1). Communication path setting block N164 sets the communication path in the equipment based on the communication path setting request from network management equipment (WS1), and memorizes the connection state information to memory block N17.

(First Embodiment)

Figure 4:
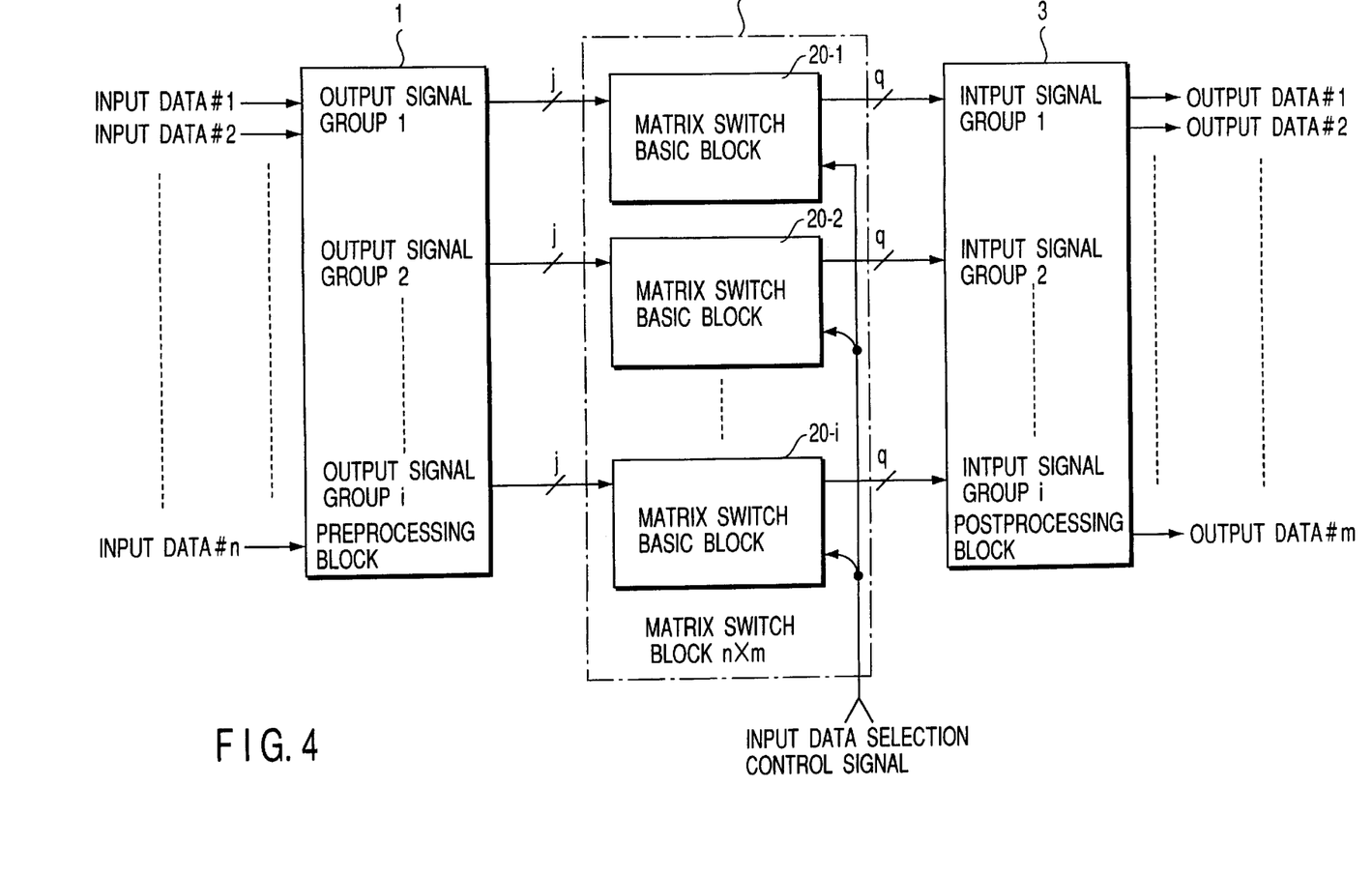
FIG. 4 is a block diagram, which shows a configuration of the entire matrix switch according to the first embodiment of the present invention.

FIG. 4 is a block diagram, which shows the configuration of the entire matrix switch according to the first embodiment of the present invention.

The matrix switch according to the first embodiment is constructed by preprocessing block 1, matrix switch block (matrix switch main body) 2 and postprocessing blocks 3. The configuration of preprocessing block 1 is shown in FIG. 5, the configuration of matrix switch block 2 is shown in FIG. 6, and the configuration of postprocessing block 3 is shown in FIG. 7.

Figure 5:
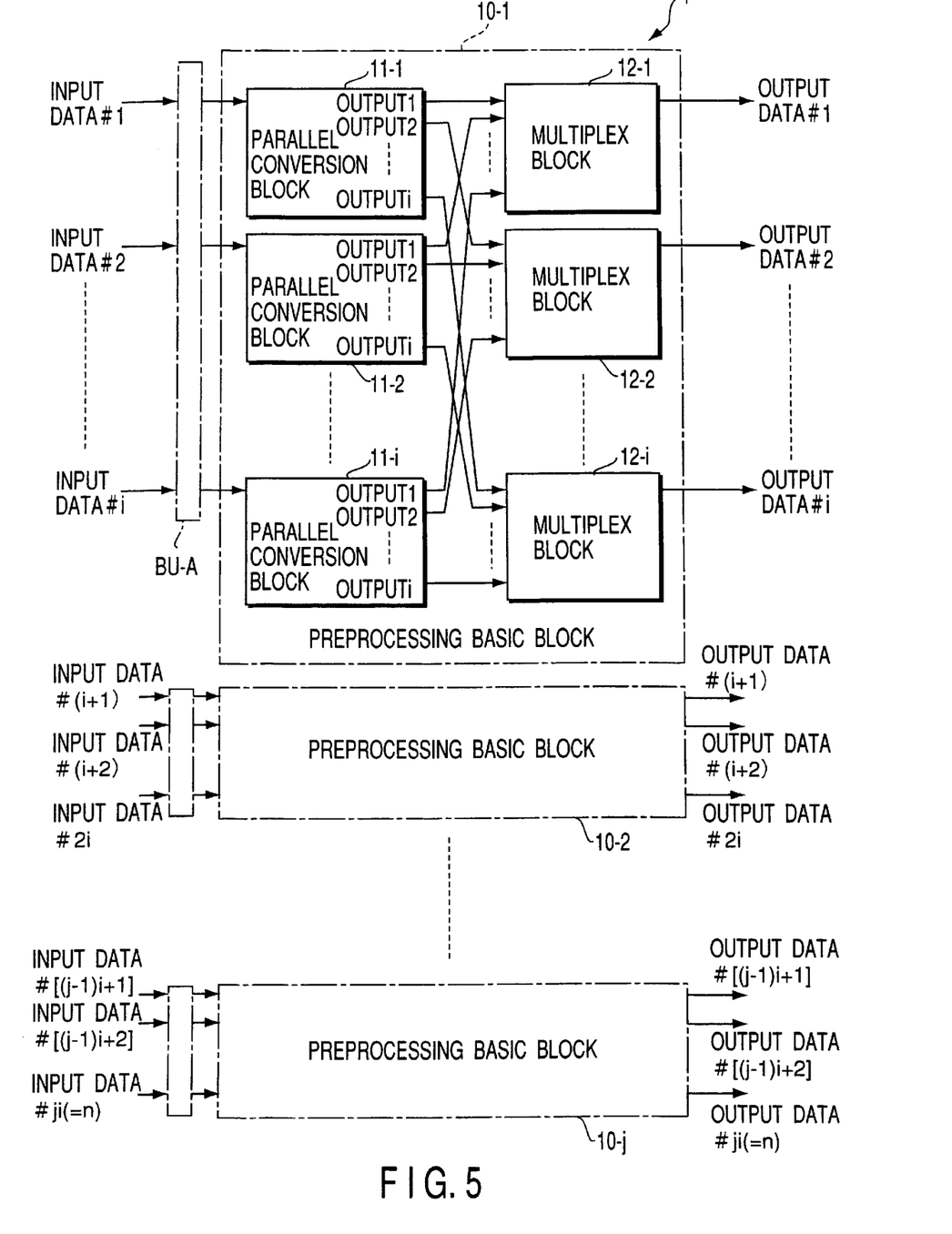
FIG. 5 is a block diagram, which shows a configuration of preprocessing block according to the first embodiment.

Preprocessing block 1 comprises preprocessing basic blocks 10-1, 10-2, . . . , 10-$j$ (here, n=i×j), in which one of parallel conversion blocks 11-1, 11-2, . . . 11-$i$, and one of multiplexing blocks 12-1, 12-2, . . . , 12-$i$, are assumed to be one basic block as shown in FIG. 5. Parallel conversion blocks 11-1, 11-2, . . . , 11-$i$ perform i-bit parallel conversion for each bit serial data of n input lines (#1 to #n). Multiplex blocks 12-1, 12-2, . . . , 12-$i$ multiply k-th bit ($1 \leq k \leq i$) of data to which i-bit parallel conversion is performed by parallel conversion blocks 11-1, 11-2, . . . , 11-$i$, respectively, for i input lines.

Figure 6:
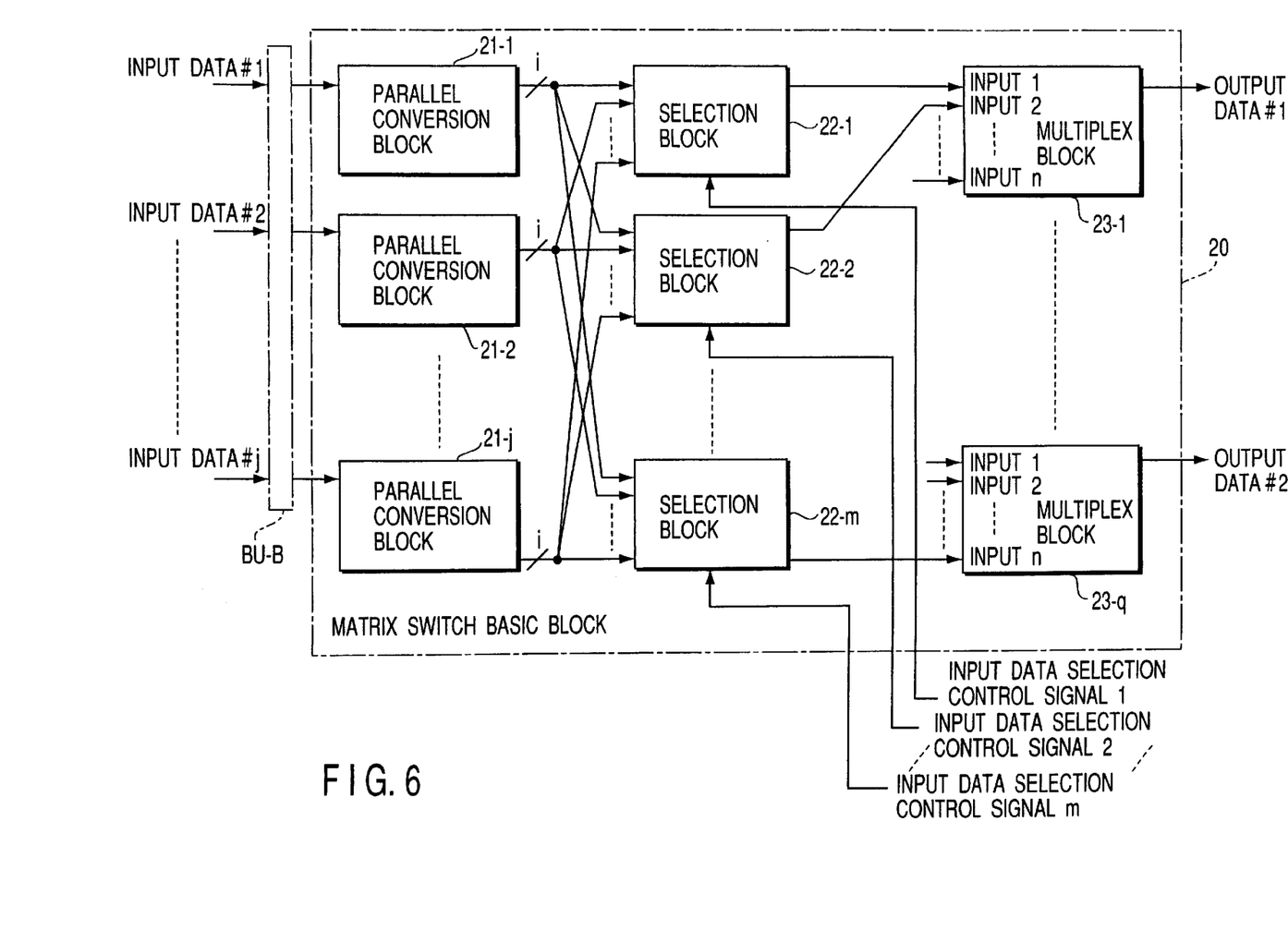
FIG. 6 is a block diagram, which shows a configuration of the matrix switch block according to the first embodiment.

Matrix switch block 2, as shown in FIG. 6, comprises matrix switch basic blocks 20-1, 20-2, . . . , 20-$i$, in which one of parallel conversion blocks 21-1, 21-2, . . . , 21-$j$, one of selection blocks 22-1, 22-2, . . . , 22-$m$, and one of multiplexing blocks 23-1, 23-2, . . . , 23-$q$ are assumed to be one basic block. Parallel conversion blocks 21-1, 21-2, . . . , 21-$j$ perform i-bit parallel conversion for the data of j input lines (#1 to #j) processed by preprocessing block 1 for every lines. Selection blocks 22-1, 22-2, . . . , 22-$m$ select the one line data from i×j data to which i-bit parallel conversion is performed, respectively, by parallel conversion blocks 21-1, 21-2, . . . , 21-$j$. Multiplex blocks 23-1, 23-2, . . . , 23-$q$ multiplex i lines of data among data selected by selection blocks 22-1, 22-2, . . . , 22-$m$, respectively.

Figure 7:
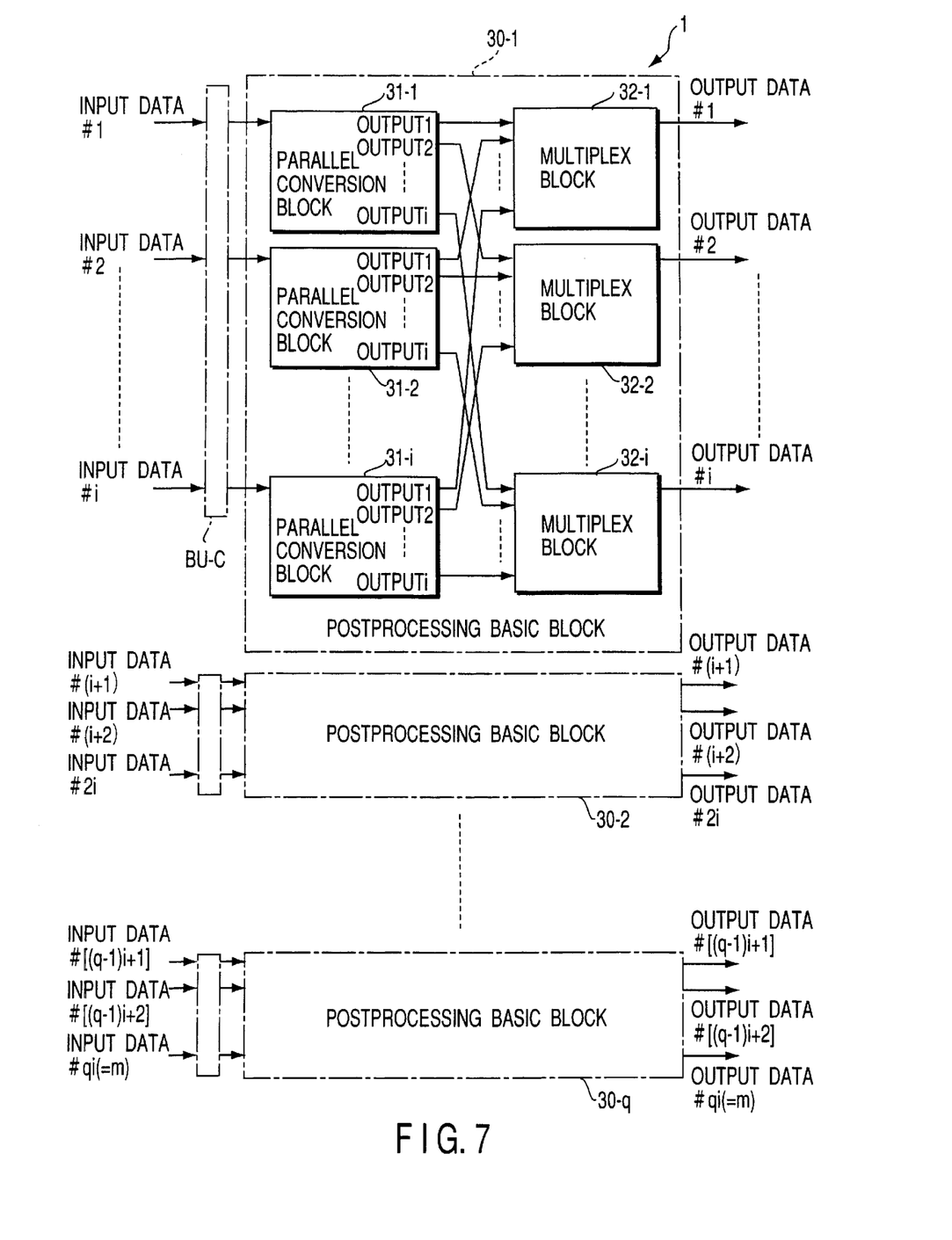
FIG. 7 is a block diagram, which shows a configuration of the postprocessing block according to the first embodiment.

Postprocessing block 3 comprises postprocessing basic block 30-1, 30-2, . . . 30-$q$, in which one of parallel conversion blocks 31-1, 31-2, . . . , 31-$i$, one of multiplexing blocks 32-1, 32-2, . . . , 32-$i$ are assumed to be one basic block 30 (here, m=i×q) as shown in FIG. 7. Parallel conversion blocks 31-1, 31-2, . . . , 31-$i$ perform i-bit parallel conversion for the q×i data output from matrix switch block 2. Multiplex blocks 32-1, 32-2, . . . , 32-$i$ multiplex k-th bit of data, in which i-bit parallel conversion is performed by parallel conversion blocks 31-1, 31-2, . . . , 31-$i$ for i input lines. The operation of elastic buffers (BU-A, BU-B, BU-C) shown in FIG. 5, FIG. 6, and FIG. 7 are described later.

FIG. 8 to FIG. 11 are figures, which show the example of the operation processing to explain an operation according to the embodiment of the present invention, respectively. FIG. 8 shows the bit stream of input data (#1 to #i) of preprocessing block 1 when n=16, i=4, and j=4, and FIG. 9 shows the bit stream of output data (#1 to #i) of preprocessing block 1, respectively. FIG. 10 shows the bit stream of input data (#1 to #i) of postprocessing block 3 when m=16, i=4, and q=4, and FIG. 11 shows the bit stream of output data (#1 to #i) of postprocessing block 3, respectively. Here, bit 1 of input/output data #1 is expressed as "1-b1", bit 2 thereof is expressed as "1-b2", bit 3 of input/output data #2 is expressed as "12-b3", and bit 4 thereof is expressed as "2-b4".

Here, a processing operation of matrix switch according to the first embodiment of the present invention will be explained referring to above-mentioned FIG. 4 to FIG. 11.

Input data #1 to #n input to preprocessing block 1 is divided into j groups each having i-lines, and is input to preprocessing basic blocks 10-1, 10-2, . . . , 10-$j$, respectively.

In each of above-mentioned preprocessing basic blocks 10-1, 10-2, ..., 10-j, parallel conversion blocks 11-1, 11-2, ..., 11-i performs i-bit parallel conversion for input data, respectively, and first bit, second bit and i-th bit of data after parallel conversion are input to multiplex block 12-1, multiplex block 12-2, and multiplex block 12-i, respectively. That is, each of the first bits is input to multiplex block 12-1, each of the second bits is input to multiplex block 12-2, each of the third bits is input to multiplex block 12-3, and each of the i-th bits is input to multiplex block 12-i, in data in which i-bit parallel conversion is performed, in parallel conversion blocks 11-1, 11-2, ..., 11-i.

Each of the above-mentioned Multiplexing blocks 12-1, 12-2, ..., 12-i performs multiplex processing of above-mentioned i-bit parallel input to one serial output and outputs it on the i output lines as output data #1 to #i.

The above-mentioned processing example (bit stream configuration of I/O data) when n=16, i=4, and j=4 in this case is shown in FIG. 8 and FIG. 9.

Here, input data #1 (1-b1, 1-b2, 1-b3, and 1-b4 (input order)) of bit serial shown in FIG. 8 is parallel-converted by parallel conversion block 11-1, and the first bit (1-b1) is input to multiplex block 12-1, the second bit (1-b2) is input to multiplex block 12-2, and the fourth bit (1-b4) is input to multiplex block 12-i (here, i=4), respectively.

Similarly, input data #2(2-b1, 2-b2, 2-b3, 2-b4) is parallel-converted by parallel conversion block 11-2, and the first bit (2-b1) is input to multiplex block 12-1, the second bit (2-b2) is input to multiplex block 12-2, and fourth bit (2-b4) is input to multiplex block 12-i, respectively.

The similar bit operation to the above-mentioned operation is performed to input data #3 (3-b1, 3-b2, 3-b3, 3-b4) and input data #4 (4-b1, 4-b2, 4-b3, 4-b4).

Therefore, as shown in FIG. 9, data (1-b1, 2-b1, 3-b1, 4-b1), which collect the i first bits (here, four bits), are output onto one line as output data #1 of the bit serial from multiplex block 12-1, data (1-b2, 2-b2, 3-b2, 4-b2), which collect the i second bits, are output onto one line as output data #2 of the bit serial from multiplex block 12-2, and data (1-b4, 2-b4, 3-b4, 4-b4), which collect i bits of i-th bits (fourth bit), are output onto one line as output data #4 of the bit serial from multiplex block 12-i.

In output data (n=i×j) of j preprocessing basic blocks 10-1, 10-2, ..., 10-j as mentioned-above, j lines of output data #1 are collected and are input to matrix switch basic block 20-1, j lines of output data #2 are collected and are input to matrix switch basic block 20-2, and j lines of output data #i are collected and are input to matrix switch basic block 20-i.

In matrix switch basic blocks 20-1, 20-2, ..., 20-i of matrix switch block 2, i-bit parallel conversion is performed for each input data by parallel conversion blocks 21-1, 21-2, ..., 21-j, and all of the data after parallel-conversion are input to selection blocks 22-1, 22-2, ..., 22-m. That is, all of input data #1 to #n input to preprocessing block 1 are input to each of selection blocks 22-1, 22-2, ..., 22-m.

In selection blocks 22-1, 22-2, ..., 22-m, the specified input data is selected and is output according to input data selection control signals (1, 2, ..., m) supplied from the external equipment (controller N16 shown in FIG. 3). In this case, all the same input data selection control signals are used for all matrix switch basic blocks 20-1, 20-2, ..., 20-i.

The selected data in selection blocks 22-1, 22-2, ..., 22-m are input to multiplexing blocks 23-1, 23-2, ..., 23-q, respectively.

Multiplexing blocks 23-1, 23-2, ..., 23-q perform the multiplex processing of i-bit parallel input to one serial output, and output the output data #1 to #q, respectively.

Output data from matrix switch basic blocks 20-1, 20-2, ..., 20-i are input to postprocessing basic block 30-1 of postprocessing block 3 by collecting i data of output data #1, input to postprocessing basic block 30-2 by collecting i data of output data #2, and are input to postprocessing basic block 30-i by collecting i data of output data #i, respectively.

In each of postprocessing basic blocks 30-1, 30-2, ..., 30-q of postprocessing block 3, i-bit parallel conversion is performed for each input data in parallel conversion block 31-1, 31-2, ..., 31-i, and the first bit of the data after parallel conversion is output to multiplex block 32-1, the second bit thereof is output to multiplex block 32-2, and the i-th bit thereof is output to multiplex block 32-i.

Multiplexing blocks 32-1, 32-2, ..., 32-i perform the multiplex processing of converting i-bit parallel input to one serial output, and output the output data #1 to #i, respectively. In this case, the above-mentioned processing example (bit stream configuration of the I/O data) is shown in FIG. 10 and FIG. 11, when m=16, i=4, and q=4. Since the specific bit operation shown in this FIG. 10 and FIG. 11 can be easily understood from the bit operation of preprocessing block 1, which has already been explained referring to FIG. 8 and FIG. 9, the explanation will be omitted here.

When output data from q postprocessing basic blocks 30-1, 30-2, ..., 30-q are summarized, the m data having output data #1 to #m set by matrix switch block 2 will be output from postprocessing block 3.

In the first embodiment as described above, though it is explained the signal of each I/O line is directly transmitted among preprocessing block 1, matrix switch block 2 and postprocessing block 3, in a real machine, by considering the phase shift by wiring the cable etc., elastic buffers (bu-a, bu-b, bu-c) are arranged either or all on the input terminal of preprocessing block 1, the input terminal of matrix switch block 2, and the input terminal of postprocessing block 3, and an operation with high reliability can be secured by further relaxing the restriction in the specification by arranging the configuration processed after all the frame phases of input data are coincide.

As described above, in the first embodiment of the present invention, while the number of the data input and output from/to matrix switch block 2 is decreased by a parallel/serial (multiplex) conversion in preprocessing block 1, matrix switch block 2, and postprocessing block 3, and is performed a division processing by matrix switch basic blocks 20-1, 20-2, ..., 20-i having width of parallel bit (width of i-bit) parallel-converted with preprocessing block 1, the function block division is easy when it is achieved as an equipment, and, in addition, even when matrix switch block 2 is divided, a complex communication path setting algorithm is not required and the control of matrix switch block 2 becomes possible in the same algorithm as a conventional configuration. Even when the bit rate of the I/O data roses, there is an advantage that low-speed processing of selection blocks 22-1, 22-2, ..., 22-m of matrix switch block 2 becomes possible, too.

(Second Embodiment)

According to the first above-mentioned embodiment, since the load to each block is decreased since data is divided to be processed, low-speed processing with the matrix switch block becomes possible. However, in the matrix switch of the first embodiment, since data is divided to be processed, and when a conventional alarm transfer method is adopted and when the fault occurs, the possibility that the fault spreads to the downstream side of the matrix switch and the broken data flows out are raised.

In this case, there is no disadvantage if the spread of the fault can be detected, but when alarm cannot be detected (for example, when data is broken such that only a certain bit is fixed to "0" or "1" among byte data), it is known not to receive normally in the termination point of the path, but it is very difficult to specify where to occur the fault.

Figure 12:
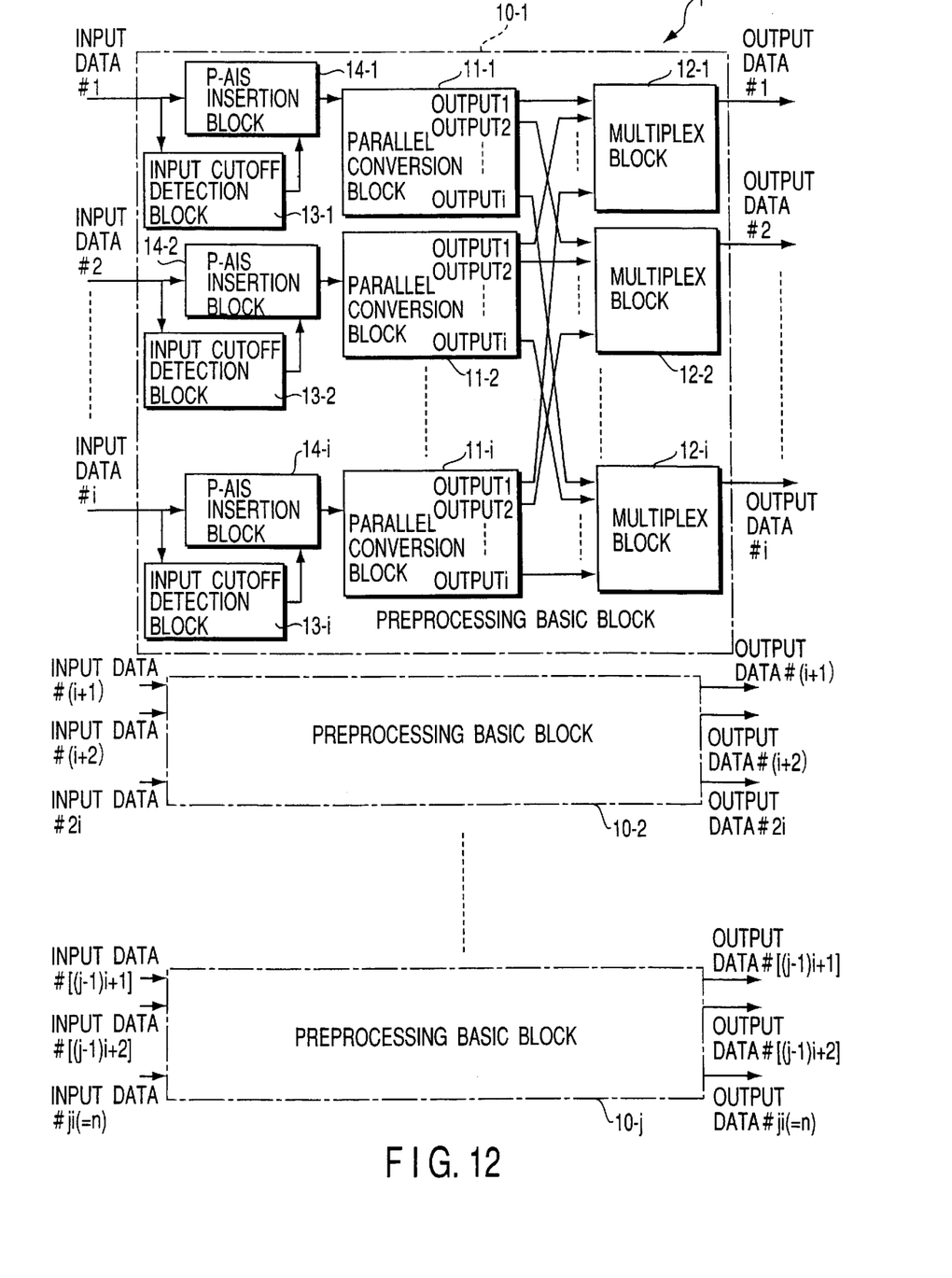
FIG. 12 is a block diagram, which shows a configuration of the preprocessing block according to the second embodiment.
Figure 13:
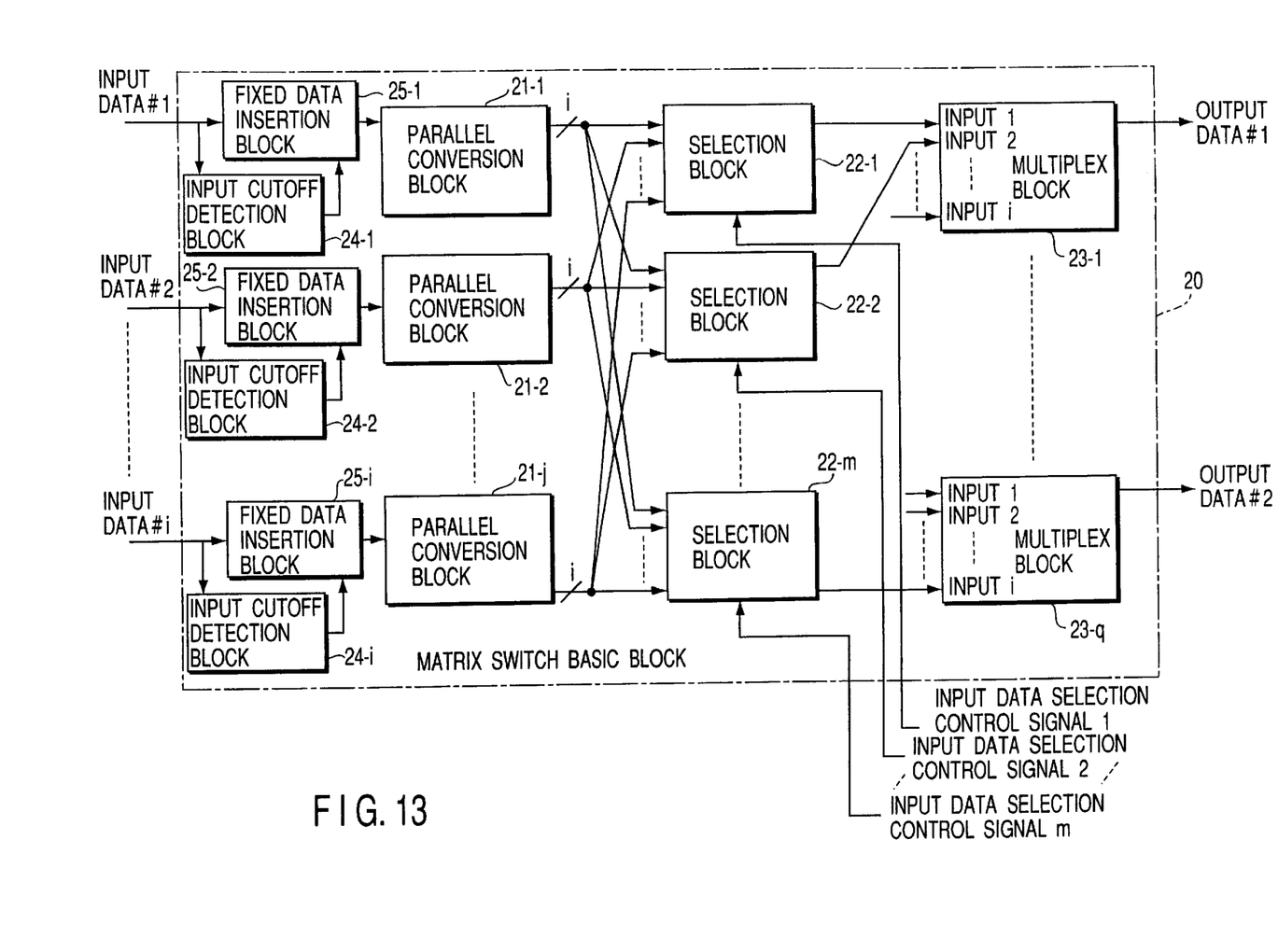
FIG. 13 is a block diagram, which shows a configuration of the matrix switch block according to the second embodiment.
Figure 14:
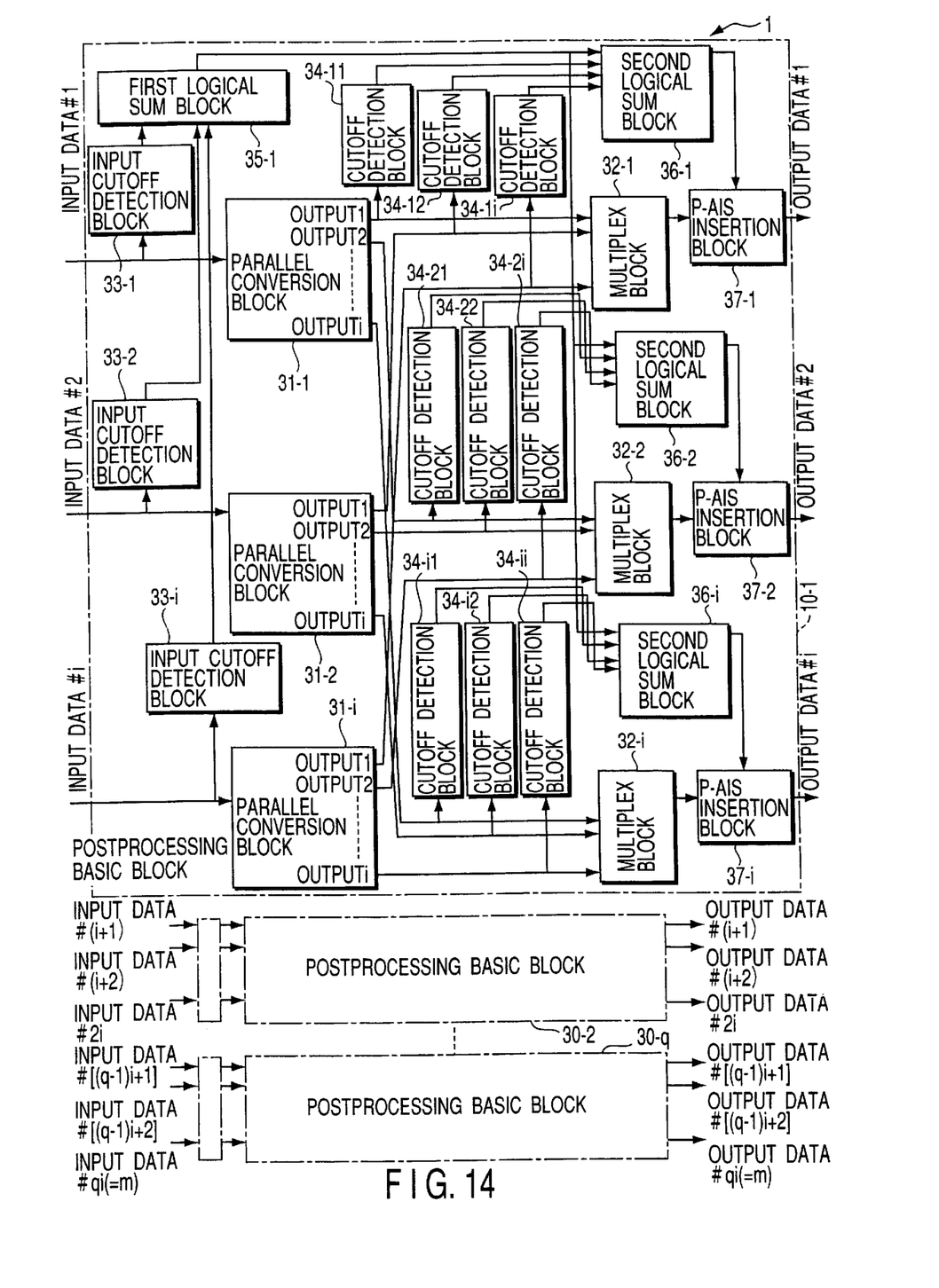
FIG. 14 is a block diagram, which shows a configuration of the postprocessing block according to the second embodiment.

Hereinafter, in the second embodiment, even when the matrix switch according to the first embodiment is adopted, the matrix switch, which can detect the fault etc. will be explained referring to FIG. 12 to FIG. 14. FIG. 12 to FIG. 14 are figures, which show preprocessing block 1, matrix switch block 2, and postprocessing block 3 of matrix switch according to the second embodiment, respectively. Since a whole configuration of matrix switch is similar to FIG. 4, drawings and explanation will be omitted. The same marks are fixed to the same parts as FIG. 5 to FIG. 7, and a detailed explanation will be omitted in FIG. 12 to FIG. 14.

Preprocessing block 1 shown in FIG. 12 comprises input cutoff detection blocks 13-1, 13-2, . . . , 13-$i$ and P-AIS (Path-Alarm Indication Signal,) insertion blocks 14-1, 14-2, . . . , 14-$i$, each of, which is arranged previous stage of parallel conversion blocks 11-1, 11-2, . . . , 11-$i$. In preprocessing block 1, the input signals of each input line data are monitored, and when the input cutoff detection blocks 13-1, 13-2, . . . , 13-$i$ detect the input cutoff alarm, P-AIS insertion blocks 14-1, 14-2, . . . , 14-$i$ insert the P-AIS signal into the input data. As a result, since abnormality of the input data in preprocessing block 1 is transferred to the downstream side as P-AIS, it can be prevented from spreading the abnormality to the downstream side as a signal, which exerts the influence on other input signals and flowing out the broken data.

Matrix switch block 2 shown in FIG. 13 comprises input cutoff detection blocks 24-1, 24-2, . . . , 24-$i$ and fixed data insertion.blocks 25-1, 25-2, . . . , 25-$i$, each of, which is arranged at previous stage of parallel conversion blocks 21-1, 21-2, . . . , 21-$j$. In matrix switch block 2, the input signals of each input line data are monitored, and when the input cutoff detection blocks 24-1, 24-2, . . . , 24-$i$ detect the input cutoff alarm, Fixed data insertion blocks 25-1, 25-2, . . . , 25-$i$ fix the input data input to parallel conversion blocks 21-1, 21-2, . . . , 21-$j$ to "0" or "1". This operation is performed to spread the fault to the downstream side, and, with this operation, the bit part with serial data of the output data after multiplexing after the path is set by matrix switch block 2 are fixed to "0" or "1". In this case, for example, when input cutoff detection block 24-1 performs cutoff detection of data input to matrix switch block 2, to the data, which relate to the input data to parallel conversion blocks 21-1, 21-2, . . . , 21-$j$ are considered that the faults have been occurred to all the input data. That is, for example, if input data is divided into eight data by parallel conversion blocks 11-1, 11-2, . . . , 11-$i$ of preprocessing block 1, since each part of data for eight paths becomes the input data to parallel conversion block 21-1 of matrix switch block 2, for example, when input cutoff detection block 24-1 detects the cutoff, finally, it is considered that the fault has been occurred in eight paths.

Postprocessing block 3 shown in FIG. 14 comprises the input cutoff detection blocks 33-1, 33-2, . . . , 33-$i$ arranged in a previous stage of parallel conversion blocks 31-1, 31-2, . . . , 31-$i$, cutoff detection block 34-11, 34-12, . . . , 34-$ii$ arranged in the latter stage of parallel conversion blocks 31-1, 31-2, . . . , 31-$i$, P-AIS insertion blocks 37-1, 37-2, . . . , 37-$i$ arranged in the latter stage of multiplexing blocks 32-1, 32-2, . . . , 32-$i$, first logical sum block 35, and second logical sum blocks 36-1, 36-2, . . . , 36-$i$. In postprocessing block 3, the input signals of each input path data are monitored, when the input cutoff detection blocks 33-1, 33-2, . . . , 33-$i$ detects the input cutoff alarm, the P-AIS signal is inserted to the output data, which correspond to the input signals by P-AIS insertion blocks 37-1, 37-2, . . . , 37-$i$, through first and second logical sum blocks 35 and 36-1, 36-2, . . . , 36-$i$. In addition, when the signals of each parallel development bit are monitored by the latter stage of parallel conversion blocks 31-1, 31-2, . . . , 31-$i$, and the determination alarm is detected with cutoff detection block 34-11, 34-12, . . . , 34-$ii$, the P-AIS signal is inserted with the P-AIS insertion block to the output data, which corresponds to the bit through the second logical sum blocks 36-1, 36-2, . . . , 36-$i$. As a result, abnormal input data to matrix switch block 2 is detected by cutoff detection block 34-11, 34-12, . . . , 34-$ii$, and abnormal input data in postprocessing block 3 is detected in the input cutoff detection blocks 33-1, 33-2, . . . , 33-$i$, then both of them are transferred to the downstream side as P-AIS. Therefore, it can be prevented from spreading abnormal input data to the downstream side as an extra alarm and flowing out the broken data.

In the second above-mentioned embodiment, the input cutoff detection blocks 13-1, 13-2, . . . , 13-$i$ and P-AIS insertion blocks 14-1, 14-2, . . . , 14-$i$ in preprocessing block 1 may be used as conventional ones.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A matrix switch characterized by comprising a matrix switch main body, a preprocessing block provided on an input side of said matrix switch main body, and a postprocessing block provided on an output side of said matrix switch main body, wherein each of said preprocessing block, said matrix switch main body and said postprocessing block comprises a circuit, which parallel-converts a line input with each setting bit width, performs a bit stream operation in the setting bit width, serially converts it, and performs line output, respectively, and said matrix switch main body is divided into said setting bit width parallel-converted with said preprocessing block and switching-control is performed.

2. The matrix switch according to claim 1, characterized in that said postprocessing block comprises an elastic buffer to an input terminal thereof.

3. The matrix switch according to claim 2, characterized in that said preprocessing block comprises a first monitor block, which monitors an input data and a first P-AIS insertion block, which inserts a P-AIS signal into the input data when abnormality of the input data is detected by said first monitor block, at a previous stage of said first parallel conversion block, said matrix switch block comprises a second monitor block, which monitors an input data and a fixed data insertion block, which inserts fixed data into the input data when abnormality of input data is detected by said second monitor block, at a previous stage of said second parallel conversion block, and said postprocessing block comprises a third monitor block, which is provided at a previous stage of said third parallel conversion block and monitors an input data, a fourth monitor block, which is provided at a latter stage of said third parallel conversion block and detects a fixed data inserted by said fixed data insertion block, a first logical sum block, which outputs a logical sum of outputs from said third monitor block, a second logical sum block, which outputs a logical sum of outputs from said first logical sum block and said fourth monitor block, and a P-AIS insertion block, which inserts a P-AIS signal into an output signal from said third monitor block according to the output from said second logical sum block.

4. The matrix switch according to claim 1, characterized in that said preprocessing block comprises an elastic buffer to an input terminal thereof.

5. The matrix switch according to claim 4, characterized in that said postprocessing block comprises an elastic buffer to an input terminal thereof.

6. The matrix switch according to claim 4, characterized in that said matrix switch block comprises an elastic buffer to an input terminal thereof.

7. The matrix switch according to claim 6, characterized in that said postprocessing block comprises an elastic buffer to an input terminal thereof.

8. The matrix switch according to claim 1, characterized in that said matrix switch block comprises an elastic buffer to an input terminal thereof.

9. The matrix switch according to claim 8, characterized in that said postprocessing block comprises an elastic buffer to an input terminal thereof.

10. Matrix switch characterized by comprising:

a preprocessing block having j preprocessing basic blocks (n=i×j: where, n, i, j, and k are natural numbers), wherein a block including n first parallel conversion blocks, which perform i-bit parallel conversion of bit serial data of each of n input lines, and an i first multiplex blocks, which multiplex a k-th bit ($1 \leq k \leq i$) of data, which performs i-bit parallel conversion with said first parallel conversion block for i input lines, are assumed to be one of said preprocessing basic blocks;

a matrix switch block having i matrix switch basic blocks (where, m and q are natural numbers), wherein j second parallel conversion blocks, which performs i-bit parallel conversion of the data of the j input lines processed by said preprocessing block, m selection blocks, which selects one data from i×j data in which i-bit parallel conversion is performed with said second parallel conversion block, and q second multiplex blocks, which multiplex i-lines of the data selected with said selection block, are assumed to be one of said matrix switch basic blocks; and a postprocessing block having p postprocessing basic blocks (m=i×q), wherein said third parallel conversion block, which performs i-bit parallel conversion of q×i data output from said matrix switch block, and a third multiplex block, which multiplexes i input lines of k-th bit of data in which i-bit parallel conversion is performed with said third parallel conversion block are assumed to be one of said postprocessing basic blocks.

11. The matrix switch according to claim 10, characterized in that said postprocessing block comprises an elastic buffer to an input terminal thereof.

12. The matrix switch according to claim 10, characterized in that said matrix switch block comprises an elastic buffer to an input terminal thereof.

13. The matrix switch according to claim 12, characterized in that said postprocessing block comprises an elastic buffer to an input terminal thereof.

14. The matrix switch according to claim 10, characterized in that said preprocessing block comprises an elastic buffer to an input terminal thereof.

15. The matrix switch according to claim 14, characterized in that said postprocessing block comprises an elastic buffer to an input terminal thereof.

16. The matrix switch according to claim 14, characterized in that said matrix switch block comprises an elastic buffer to an input terminal thereof.

17. The matrix switch according to claim 16, characterized in that said postprocessing block comprises an elastic buffer to an input terminal thereof.

18. A matrix switch characterized in that a line input is parallel-converted with a predetermined bit width, and a selection processing is performed with a plurality of matrix switch main bodies having a width corresponding to each of plurality of bit widths, thereafter a serial conversion is performed and a serial-converted signal is output.

* * * * *